United States Patent [19]
Appleby

[11] Patent Number: 5,802,660
[45] Date of Patent: Sep. 8, 1998

[54] WIND-ACTIVATED SIDE VIEW MIRROR CLEANER

[76] Inventor: Timothy C. Appleby, 17 Parkville Road, Withington, Manchester, United Kingdom, M2O 4TX

[21] Appl. No.: 903,602

[22] Filed: Jul. 31, 1997

[51] Int. Cl.$^6$ ........................................ B60S 1/56
[52] U.S. Cl. ................ 15/250.003; 15/246; 15/210.1
[58] Field of Search ............................ 15/220.1, 250.001, 15/250.002, 250.003, 250, 361, 250.18, 210.1, 209.1, 211, 226, 246; 280/762; 359/896

[56] References Cited

U.S. PATENT DOCUMENTS

| | | | |
|---|---|---|---|
| 1,730,785 | 10/1929 | Romao | 15/211 |
| 2,537,149 | 1/1951 | McKeen | 15/211 |
| 2,998,799 | 9/1961 | Placek | 280/762 |

FOREIGN PATENT DOCUMENTS

| | | | |
|---|---|---|---|
| 2929145 | 2/1981 | Germany | 15/250.003 |
| 3025121 | 1/1982 | Germany | 15/250.003 |
| 34397 | 6/1938 | United Kingdom | 15/211 |
| 1280318 | 7/1972 | United Kingdom | 15/250.001 |
| 2266229 | 10/1993 | United Kingdom | 15/250.003 |

*Primary Examiner*—Gary K. Graham

[57] ABSTRACT

A new WIND-ACTIVATED SIDE VIEW MIRROR CLEANER for CLEARING MOISTURE, DUST, ROAD SALT AND DIRT FROM THE MIRROR WHILE TRAVELING. The inventive device includes a length of cord coupled with a side view mirror of a vehicle. A plurality of tassels are coupled with a free end of the length of cord. The tassels will come in contact with the side view mirror during motion of the vehicle.

11 Claims, 2 Drawing Sheets

WIND-ACTIVATED SIDE VIEW MIRROR CLEANER

BACKGROUND OF THE INVENTION

1. Field of the Invention

The present invention relates to SIDE MIRROR WIPERS and more particularly pertains to a new WIND-ACTIVATED SIDE VIEW MIRROR CLEANER for CLEARING MOISTURE, DUST, ROAD SALT AND DIRT FROM THE MIRROR WHILE TRAVELING.

2. Description of the Prior Art

The use of SIDE MIRROR WIPERS is known in the prior art. More specifically, SIDE MIRROR WIPERS heretofore devised and utilized are known to consist basically of familiar, expected and obvious structural configurations, notwithstanding the myriad of designs encompassed by the crowded prior art which have been developed for the fulfillment of countless objectives and requirements.

Known prior art SIDE MIRROR WIPERS include U.S. Pat. No. 4,929,072 to Fujie et al.; U.S. Pat. No. 4,457,597 to DeGideo; U.S. Pat. No. 4,550,468 to Nelson; U.S. Pat. No. 4,611,761 to Pollard; U.S. Pat. No. 4,550,988 to Harder et al.; and U.S. Pat. No. Des. 325,454.

While these devices fulfill their respective, particular objectives and requirements, the aforementioned patents do not disclose a new WIND-ACTIVATED SIDE VIEW MIRROR CLEANER. The inventive device includes a length of cord coupled with a side view mirror of a vehicle. A plurality of tassels are coupled with a free end of the length of cord. The tassels will come in contact with the side view mirror during motion of the vehicle.

In these respects, the WIND-ACTIVATED SIDE VIEW MIRROR CLEANER according to the present invention substantially departs from the conventional concepts and designs of the prior art, and in so doing provides an apparatus primarily developed for the purpose of CLEARING MOISTURE, DUST, ROAD SALT AND DIRT FROM THE MIRROR WHILE TRAVELING.

SUMMARY OF THE INVENTION

In view of the foregoing disadvantages inherent in the known types of SIDE MIRROR WIPERS now present in the prior art, the present invention provides a new WIND-ACTIVATED SIDE VIEW MIRROR CLEANER construction wherein the same can be utilized for CLEARING MOISTURE, DUST, ROAD SALT AND DIRT FROM THE MIRROR WHILE TRAVELING.

The general purpose of the present invention, which will be described subsequently in greater detail, is to provide a new WIND-ACTIVATED SIDE VIEW MIRROR CLEANER apparatus and method which has many of the advantages of the SIDE MIRROR WIPERS mentioned heretofore and many novel features that result in a new WIND-ACTIVATED SIDE VIEW MIRROR CLEANER which is not anticipated, rendered obvious, suggested, or even implied by any of the prior art SIDE MIRROR WIPERS, either alone or in any combination thereof.

To attain this, the present invention generally comprises a wind-activated side view mirror cleaner for use with a side view mirror of a vehicle. The side view mirror includes upper and lower frame members extending outwardly from the vehicle with the side view mirror positioned between the upper and lower frame members. The wind-activated side view mirror includes a length of cord having a looped first end portion and a free second end portion. The looped first end portion is formed when the length of cord is looped backed and tied together by a length of wound nylon wrapped therearound. A chamois cover is positioned over the wound nylon. The length of cord is coupled with the lower frame member of the side view mirror of the vehicle. A plurality of chamois tassels are coupled with the free second end portion of the length of cord. Interior ends of the tassels are coupled with the free second end portion of the cord by a length of wound nylon wrapped therearound. A chamois cover is positioned over the wound nylon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new WIND-ACTIVATED SIDE VIEW MIRROR CLEANER apparatus and method which has many of the advantages of the SIDE MIRROR WIPERS mentioned heretofore and many novel features that result in a new WIND-ACTIVATED SIDE VIEW MIRROR CLEANER which is not anticipated, rendered obvious, suggested, or even implied by any of the prior art SIDE MIRROR WIPERS, either alone or in any combination thereof.

It is another object of the present invention to provide a new WIND-ACTIVATED SIDE VIEW MIRROR CLEANER which may be easily and efficiently manufactured and marketed.

It is a further object of the present invention to provide a new WIND-ACTIVATED SIDE VIEW MIRROR CLEANER which is of a durable and reliable construction.

An even further object of the present invention is to provide a new WIND-ACTIVATED SIDE VIEW MIRROR CLEANER which is susceptible of a low cost of manufacture with regard to both materials and labor, and which accordingly is then susceptible of low prices of sale to the consuming public, thereby making such WIND-ACTIVATED SIDE VIEW MIRROR CLEANER economically available to the buying public.

Still yet another object of the present invention is to provide a new WIND-ACTIVATED SIDE VIEW MIRROR CLEANER which provides in the apparatuses and methods of the prior art some of the advantages thereof, while simultaneously overcoming some of the disadvantages normally associated therewith.

Still another object of the present invention is to provide a new WIND-ACTIVATED SIDE VIEW MIRROR CLEANER for CLEARING MOISTURE, DUST, ROAD SALT AND DIRT FROM THE MIRROR WHILE TRAVELING.

Yet another object of the present invention is to provide a new WIND-ACTIVATED SIDE VIEW MIRROR CLEANER which includes a length of cord coupled with a side view mirror of a vehicle. A plurality of tassels are coupled with a free end of the length of cord. The tassels will come in contact with the side view mirror during motion of the vehicle.

Still yet another object of the present invention is to provide a new WIND-ACTIVATED SIDE VIEW MIRROR CLEANER that would allow a driver to maintain a full view into adjacent lanes.

Even still another object of the present invention is to provide a new WIND-ACTIVATED SIDE VIEW MIRROR CLEANER that would be attached to both side view mirrors of the vehicle where applicable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
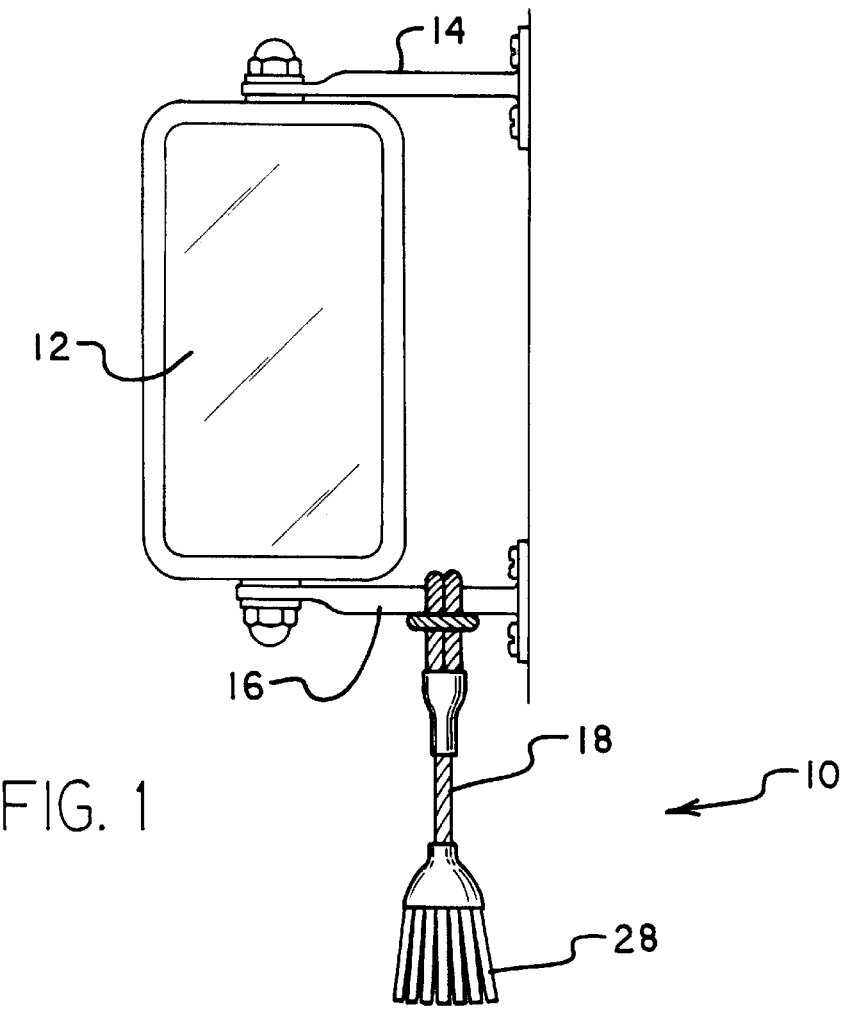
FIG. 1 is a front view of a new WIND-ACTIVATED SIDE VIEW MIRROR CLEANER according to the present invention.
Figure 2:
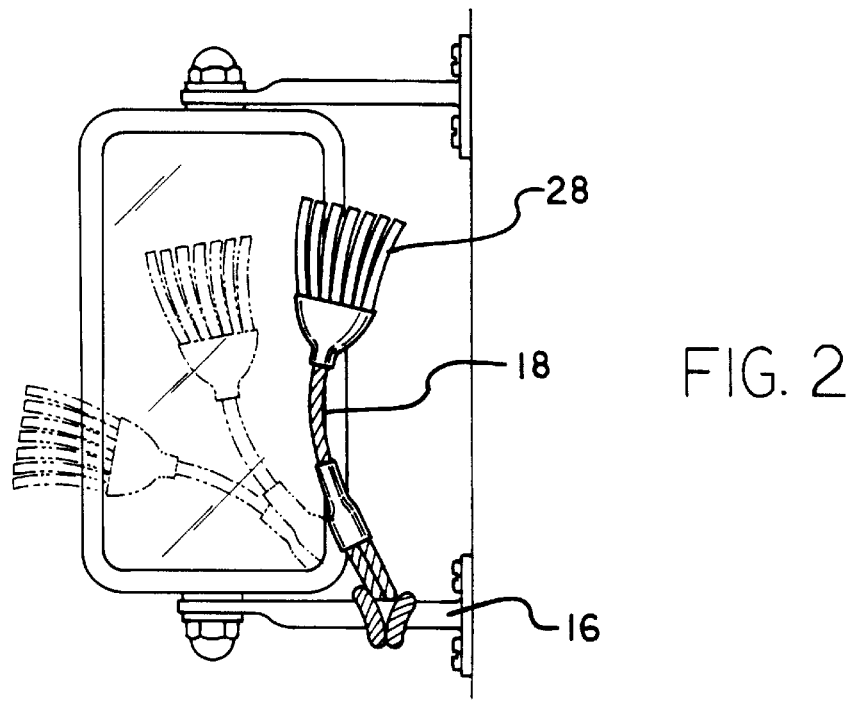
FIG. 2 is a front view of the present invention illustrated in use.
Figure 3:
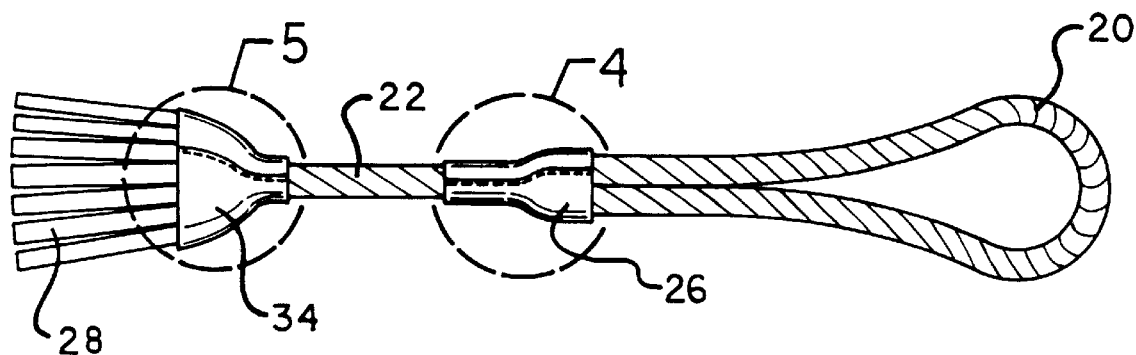
FIG. 3 is a top plan view of the present invention.
Figure 4:
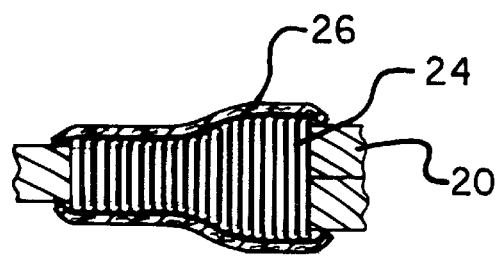
FIG. 4 is a cross-sectional view of the present invention as taken from circle 4 of FIG. 3.
Figure 5:
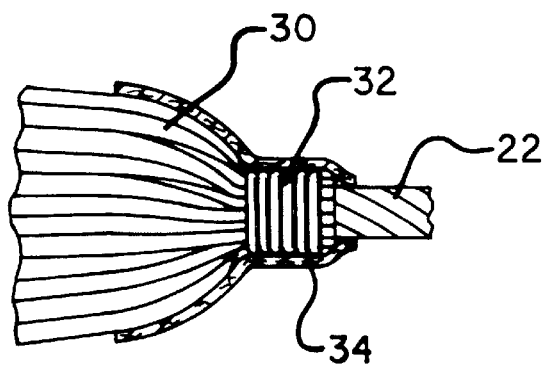
FIG. 5 is a cross-sectional view of the present invention as taken from circle 5 of FIG. 3.

With reference now to the drawings, and in particular to FIGS. 1 through 5 thereof, a new WIND-ACTIVATED SIDE VIEW MIRROR CLEANER embodying the principles and concepts of the present invention and generally designated by the reference numeral 10 will be described.

As best illustrated in FIGS. 1 through 5, the WIND-ACTIVATED SIDE VIEW MIRROR CLEANER 10, in the preferred embodiment, is for use with a side view mirror 12 of a vehicle. The side view mirror 12 includes upper 14 and lower frame members 16 extending outwardly from the vehicle with the side view mirror 12 positioned between the upper 14 and lower frame members 16. Note FIG. 1.

The wind-activated side view mirror 10 includes a length of cord 18 having a looped first end portion 20 and a free second end portion 22. The looped first end portion 20 is formed when the length of cord is looped backed and tied together by a length of wound nylon 24 wrapped therearound. A chamois cover 26 is positioned over the wound nylon 24. The length of cord 18 is coupled with the lower frame member 16 of the side view mirror 12 of the vehicle.

A plurality of chamois tassels 28 are coupled with the free second end portion 22 of the length of cord 18. Interior ends 30 of the tassels 28 are coupled with the free second end portion 22 of the cord 18 by a length of wound nylon 32 wrapped therearound. A chamois cover 34 is positioned over the wound nylon 32.

In use, the length of cord 18 is secured to the side view mirror 12 with the looped first end portion 20 positioned against the frame of the side view mirror 12 and the tassels 28 and the free second end portion 22 threaded through the looped first end portion 20. The tassels 28 will then hang freely from the side view mirror 12. Note FIG. 1. As the vehicle is moving, the force of the wind blowing and the generation of wind by the movement of the vehicle will cause the length of cord 18 to raise upwardly with the tassels 28 coming in contact with the mirror 12. The tassels 28 will also contact the window adjacent to the side view mirror 12. Thus, both the side view mirror 12 and the window will be cleared of any moisture, dirt, or the like for these surfaces. Note FIG. 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In a vehicle having a side view mirror attached thereto, a wind activated side view mirror cleaner coupled with said mirror, said cleaner comprising:

a length of cord having a looped first end portion and a free second end portion, the looped first end portion being formed when the length of cord is looped backed and tied together by a length of wound nylon wrapped therearound, a chamois cover positioned over the wound nylon, the length of cord coupled with the lower frame member of the side view mirror of the vehicle; and a plurality of chamois tassels coupled with the free second end portion of the length of cord, interior ends of the tassels coupled with the free second end portion of the cord by a length of wound nylon wrapped therearound, a chamois cover positioned over the wound nylon.

2. In a vehicle having a side view mirror attached thereto, a wind activated side view mirror cleaner coupled with said mirror, said cleaner comprising:
   a length of cord coupled with the side view mirror of the vehicle; and
   a plurality of tassels coupled with a free end of the length of cord.

3. The wind-activated side view mirror cleaner as set forth in claim 2 wherein the length of cord has a looped first end portion and a free second end portion.

4. The wind-activated side view mirror cleaner as set forth in claim 3 wherein the looped first end portion is formed when the length of cord is looped backed and tied together by a length of wound nylon wrapped therearound.

5. The wind-activated side view mirror cleaner as set forth in claim 4 and further including a chamois cover positioned over the wound nylon.

6. The wind-activated side view mirror cleaner as set forth in claim 2 wherein interior ends of the tassels are coupled with the length of cord by a length of wound nylon wrapped therearound.

7. The wind-activated side view mirror cleaner as set forth in claim 6 and further including a chamois cover positioned over the wound nylon.

8. In a vehicle having a side view mirror attached thereto, a wind activated side view mirror cleaner coupled with said mirror, said cleaner comprising:
   a length of cord coupled with the side view mirror of the vehicle; and
   a tassel coupled to a free end of the length of cord.

9. The wind-activated side view mirror cleaner as set forth in claim 8 wherein the length of cord has a looped first end portion and a free second end portion.

10. The wind-activated side view mirror cleaner as set forth in claim 9 wherein the looped first end portion is formed when the length of cord is looped backed and tied together by a length of wound nylon wrapped therearound.

11. The wind-activated side view mirror cleaner as set forth in claim 10 and further including a chamois cover positioned over the wound nylon.

\* \* \* \* \*